United States Patent Office.

JOHN COMMINS, OF CHARLESTON, SOUTH CAROLINA.

Letters Patent No. 100,729, dated March 15, 1870.

IMPROVEMENT IN FERTILIZERS.

The Schedule referred to in these Letters Patent and making part of the same

*To whom it may concern:*

Be it known that I JOHN COMMINS, of Charleston, in the district of Charleston, and State of South Carolina, have invented a new and improved Fertilizer; and I do hereby declare that the following is a full, clear, and exact description thereof.

The object of this invention is to improve the fertilizer for which I have heretofore made application for Letters Patent of the United States, by the addition thereto of ground phosphate of "lime," as will be hereinafter explained.

The following description will enable others to understand the manner of producing my improved fertilizer.

I take, say, one part of gas liquor, three parts of blood, and one five-hundredth part of sulphuric acid, and to these substances I add an equal quantity of dry ground phosphate of lime, mix the whole thoroughly together, and then evaporate to dryness.

It should be understood that the compound of blood, gas liquor, and sulphuric acid forms a fluid, or semi-fluid, and that while in this condition the phosphate should be added to and thoroughly mixed with it. The dry phosphate will then rapidly absorb moisture from the other substances mentioned and cause the whole to dry rapidly, without losing the ammonia or other elements, valuable on account of their fertilizing properties.

I do not claim, under this petition, a compound of blood, gas liquor, and sulphuric acid, as this compound forms the subject of an application for a patent of the United States previously made by me. Neither do I confine myself to the precise relative proportions of the several ingredients constituting the improved fertilizer, as such proportions may be varied according to circumstances.

Having described my invention,

What I claim as new, and desire to secure by Letters Patent, is—

A fertilizer, composed of the several ingredients mixed together, substantially as described.

JOHN COMMINS.

Witnesses:
   WM. B. BURKE,
   T. S. NIPSON.